(12) United States Patent
Lefor

(10) Patent No.: US 11,017,412 B2
(45) Date of Patent: May 25, 2021

(54) CONTEXTUAL INFORMATION MONITORING

(71) Applicant: Microsoft Technology Licensing, LLC, Redmond, WA (US)

(72) Inventor: Todd Lefor, Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 991 days.

(21) Appl. No.: 14/493,019

(22) Filed: Sep. 22, 2014

(65) Prior Publication Data

US 2015/0339679 A1    Nov. 26, 2015

Related U.S. Application Data

(60) Provisional application No. 62/002,694, filed on May 23, 2014.

(51) Int. Cl.
*G06Q 30/02* (2012.01)
*G06Q 10/10* (2012.01)

(52) U.S. Cl.
CPC ......... *G06Q 30/0201* (2013.01); *G06Q 10/10* (2013.01)

(58) Field of Classification Search
CPC ............................ G06Q 10/10; G06Q 30/0201
USPC ....................................................... 709/224
See application file for complete search history.

(56) References Cited

U.S. PATENT DOCUMENTS

| | | | |
|---|---|---|---|
| 6,260,035 B1* | 7/2001 | Horvitz | G06N 5/00 706/60 |
| 7,359,935 B1* | 4/2008 | Karipides | H04L 67/22 709/203 |
| 7,673,340 B1 | 3/2010 | Cohen et al. | |
| 8,612,463 B2* | 12/2013 | Brdiczka | G06Q 30/02 707/758 |
| 2008/0115086 A1* | 5/2008 | Rupp | G06F 11/3072 715/810 |
| 2009/0036102 A1* | 2/2009 | Ho | H04L 67/28 455/412.2 |
| 2009/0199051 A1* | 8/2009 | Jann | G06F 11/3466 714/57 |
| 2009/0287643 A1 | 11/2009 | Corville et al. | |
| 2012/0246302 A1* | 9/2012 | Lafleur | G06Q 30/02 709/224 |
| 2012/0265824 A1 | 10/2012 | Lawbaugh | |
| 2013/0054509 A1 | 2/2013 | Kass et al. | |

FOREIGN PATENT DOCUMENTS

| | | |
|---|---|---|
| WO | WO 2009/017712 A1 | 2/2009 |
| WO | WO 2012/022021 A1 | 2/2012 |

OTHER PUBLICATIONS

Baldauf et al. "A Survey on Context-Aware Systems", vol. 2, No. 4, 2017. http://www.infosys.tuwien.ac.at/Staff/sd/papers/ASurveyOnContextAwareSystems.pdf.*

(Continued)

*Primary Examiner* — James E Springer
*Assistant Examiner* — Patrick F Ngankam
(74) *Attorney, Agent, or Firm* — Christopher J. Volkmann; Kelly, Holt & Christenson, PLLC

(57) ABSTRACT

Context information in a computer system is collected. Dependent context data maintains a reference to parent context data so that system context can be reconstructed and analyzed.

20 Claims, 12 Drawing Sheets

(56) References Cited

OTHER PUBLICATIONS

Baldauf et al. "A survey on context-aware systems", vol. 2, No. 4, 2007, http://www.infosys.tuwien.ac.at/Staff/sd/papers/ASurveyOnContextAwareSystems.pdf.*
Baldauf et al "A survey on context-aware systems", http://www.infosys.tuwien.ac.at/Staff/sd/papers/ASurveyOnContextAwareSystems.pdf (Year: 2007).*
Baldauf et al "A survey on context-aware systems", https://www.infosys.tuwien.ac.at/Staff/sd/papers/ASurveyOnContextAwareSystems.pdf (Year: 2007).*
Baldauf et al "A survey on context-aware systems" http://www.cs.umd.edu/class/spring2018/cmsc818G/files/surveyoncontextawaresystems.pdf (Year: 2007).*
Baldauf et al "A survey on context-aware systems" http://www.cs.umd.edu/class/spring2013/cmsc818g/files/hyunpresentation.pdf (Year: 2007).*
International Search Report and Written Opinion for International Patent Application No. PCT/US2015/031865, dated Aug. 3, 2015, date of filing: May 21, 2015, 12 pages.
Kyungmin Cho et al.: "HiCon: a Hierarchical Context Monitoring and Composition Framework for Next-Generation Context-Aware Services", IEEE Network, IEEE Service Center, New York, NY, US, vol. 22, No. 4, Jul. 1, 2008, pp. 34-42.
Matthias Baldauf et al.: "A survey on context-aware systems", International Journal of Ad Hoc and Ubiquitous Computing, Inderscience Publishers, XX, vol. 2, No. 4, Jan. 1, 2007, pp. 263-277.
Wei Liu et al.: "A Survey on Context Awareness", Computer Science and Service System (CSSS), 2011 International Conference on, IEEE, Jun. 27, 2011, pp. 144-147.
International Preliminary Report on Patentability for International Patent Application No. PCT/US2015/031865, dated Jul. 15, 2016, date of filing: May 21, 2015, 8 pages.
Second Written Opinion for International Patent Application No. PCT/US2015/031865 datd Apr. 8, 2016, date of filing: May 21, 2015, 7 pages.

* cited by examiner

CONTEXTUAL INFORMATION MONITORING

CROSS-REFERENCE TO RELATED APPLICATION

The present application is based on and claims the benefit of U.S. provisional patent application Ser. No. 62/002,694, filed May 23, 2014, the content of which is hereby incorporated by reference in its entirety.

BACKGROUND

Computer systems are currently in wide use. Some computer systems have many different user interface display screens, each of which has a variety of different controls.

By way of example, some computer systems include business systems. Business systems, for instance, can include enterprise resource planning (ERP) systems, customer relations management (CRM) systems, line-of-business (LOB) systems, among others. These types of business systems can have 5,000-10,000 user interface display screens, each of which can have hundreds of different controls and control states.

Companies that manufacture business systems can have hundreds or thousands of developers working on different aspects of the systems. The developers can find it valuable to understand how customers are using the business systems.

It will be appreciated that business systems and other large computing systems are discussed as examples only. The present discussion can be applicable to other computing systems as well.

The discussion above is merely provided for general background information and is not intended to be used as an aid in determining the scope of the claimed subject matter.

SUMMARY

Context information in a computer system is collected. Dependent context data maintains a reference to parent context data so that system context can be reconstructed and analyzed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
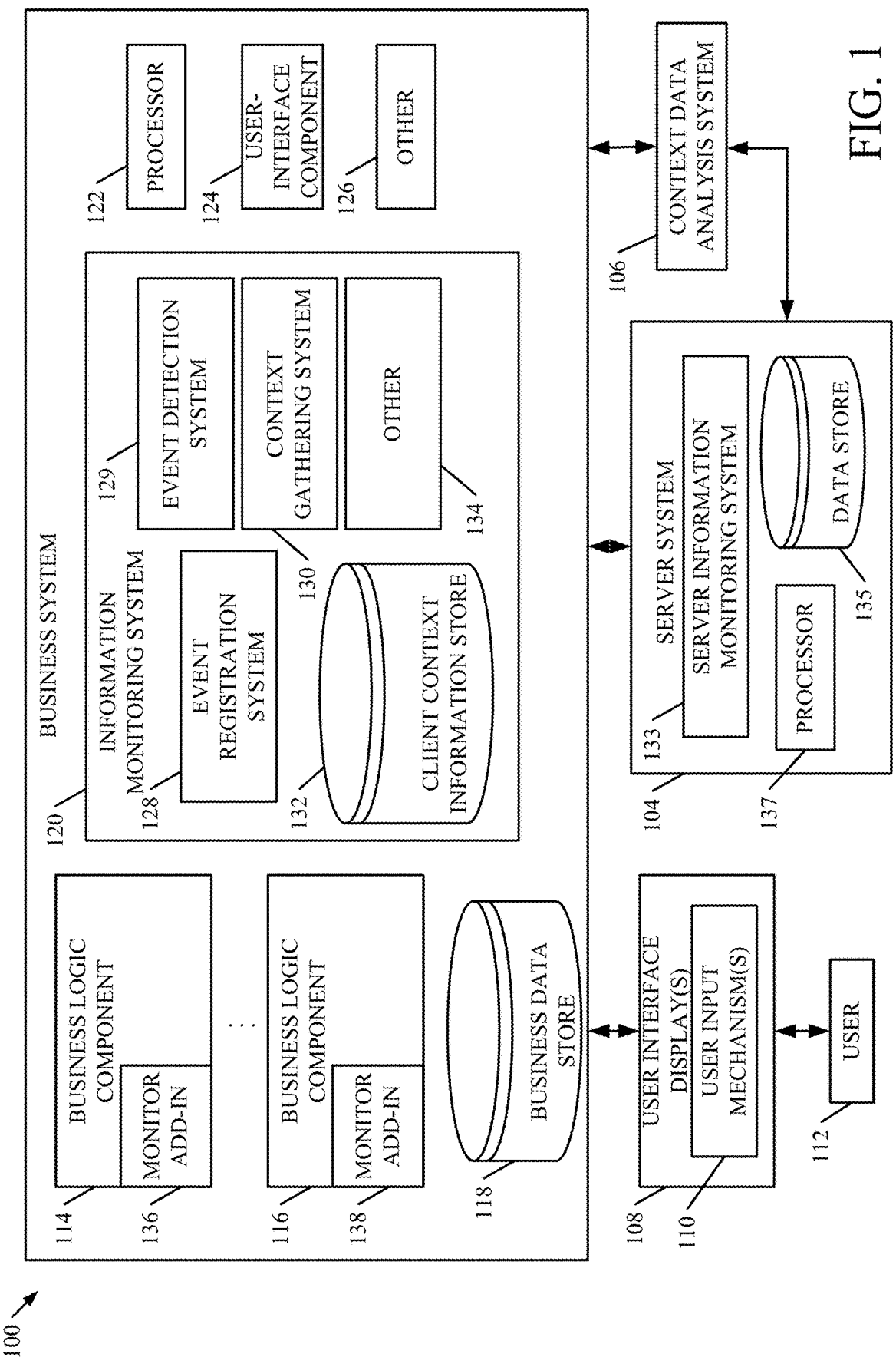
FIG. 1 is a block diagram of one embodiment of a contextual information monitoring architecture.

FIG. 1 is a block diagram of one embodiment of a contextual information monitoring architecture 100. Architecture 100 illustratively includes business system 102, server system 104 and context data analysis system 106. In the embodiment shown in FIG. 1, the architecture 100 is described with respect to business system 102. It will be appreciated, however, that a business system is only one type of system where context monitoring can be used. Thus, the present description can be applied to a wide variety of other computer systems as well, and business system 102 is described by way of example only.

Business system 102 is shown generating user interface displays 108 with user input mechanisms 110 for interaction by user 112. User 112 illustratively interacts with input mechanisms 110 to control and manipulate business system 102, in order to perform his or her business tasks in the organization using business system 102.

Business system 102 illustratively includes a set of business logic components 114-116 (each of which can have a context monitor component or add-in 136, 138), business data store 118, information monitoring system 120, processor 122, user interface component 124 and it can include other items 126 as well. Data store 118 illustratively stores entities, processes, workflows, and a wide variety of other business data records. Entities can include information that defines and describes an entity that is defined within business system 102. For instance, the entities can include vendor entities that describe and define vendors, customer entities that describe and define customers, business opportunity entities that describe and define business opportunities, product entities that describe and define various products, purchase order entities that describe and define purchase orders, among a wide variety of other things.

Business logic components 114-116 illustratively operate on the business data in data store 118 and run the workflows and processes to perform the operations of the business that is deploying business system 102. For instance, business logic components 114-116 can include general ledger applications, a wide variety of other accounting applications, inventory tracking applications, messaging applications, applications that track customers, applications that track vendors and business opportunities, among a wide variety of other business logic components.

User interface component 124, either on its own or under the control of other items in business system 102, illustratively generates the user interface displays 108. This allows user 112 to interact with business system 102.

Information monitoring system 120 illustratively includes event registration system 128, event detection system 129, context gathering system 130, client context information store 132, and it can include other items 134 as well. Before describing the overall operation of architecture 100 in more detail, a brief overview will be provided.

Business logic components 114-116 illustratively register for various events in event registration system 128. When various events are detected by event detection system 129, context gathering system 130 gathers context information corresponding to the event. Any business logic components 114-116 that have registered for the event are notified, and the corresponding context monitor add-in components 136-138 provide additional context information corresponding to the event. The context information can be stored in context information store 132 while additional context information is being added.

At some point, information monitoring system 120 can transmit the entire collected package of context information, corresponding to the detected event, to server system 104. Server system 104 illustratively includes server information monitoring system 133, data store 135 and processors 137. Server information monitoring system 133 can add additional server-based context information to the event and can store the information in data store 135. The context information can be output to, or later accessed by, context data analysis system 106 where it can be analyzed for a wide variety of different reasons. For instance, the analysis can be performed in order to improve business system 102, or for other reasons.

Figure 2A:
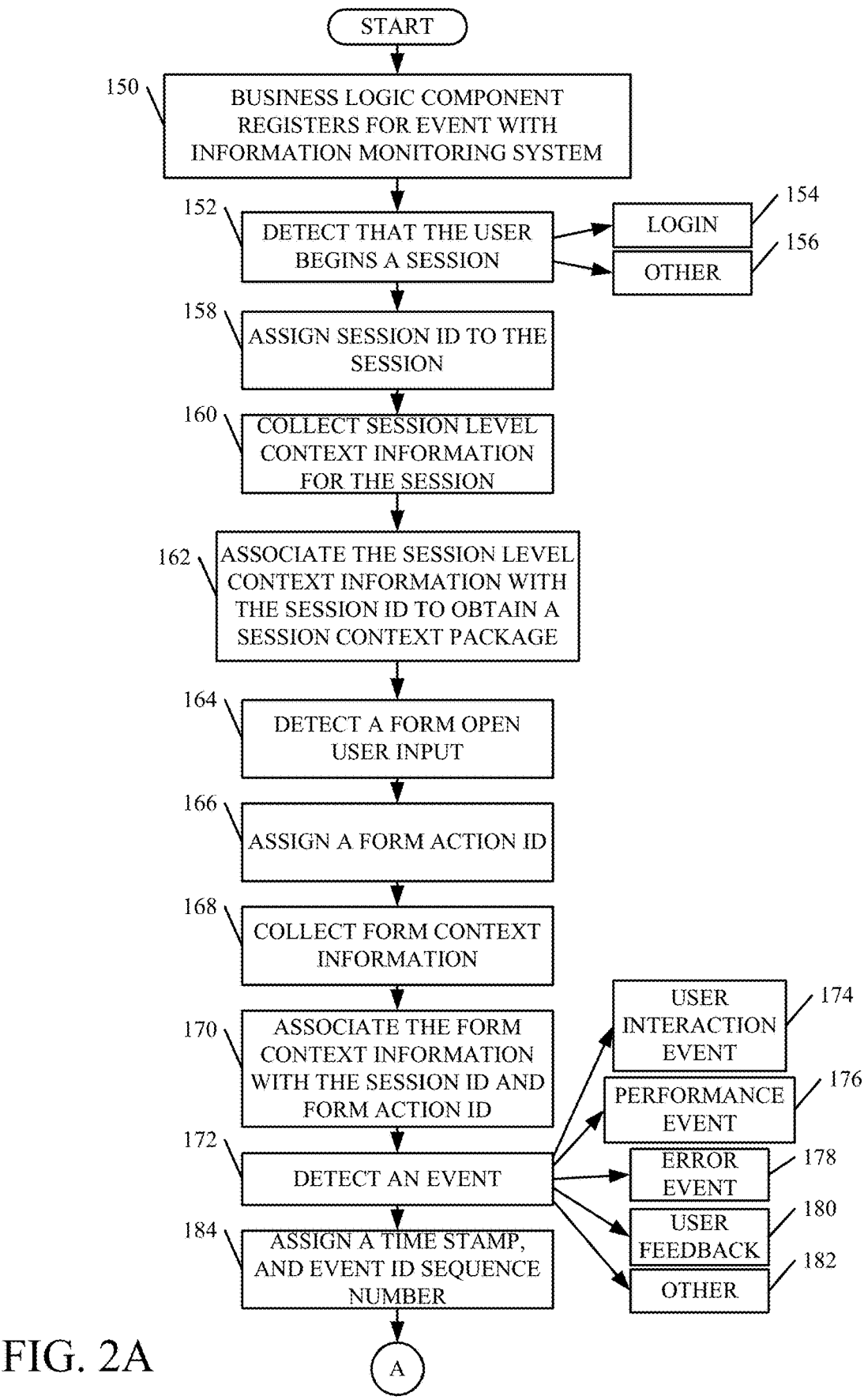
FIGS. 2A and 2B (collectively FIG. 2) show a flow diagram illustrating one embodiment of the operation of the architecture shown in FIG. 1.
Figure 2B:
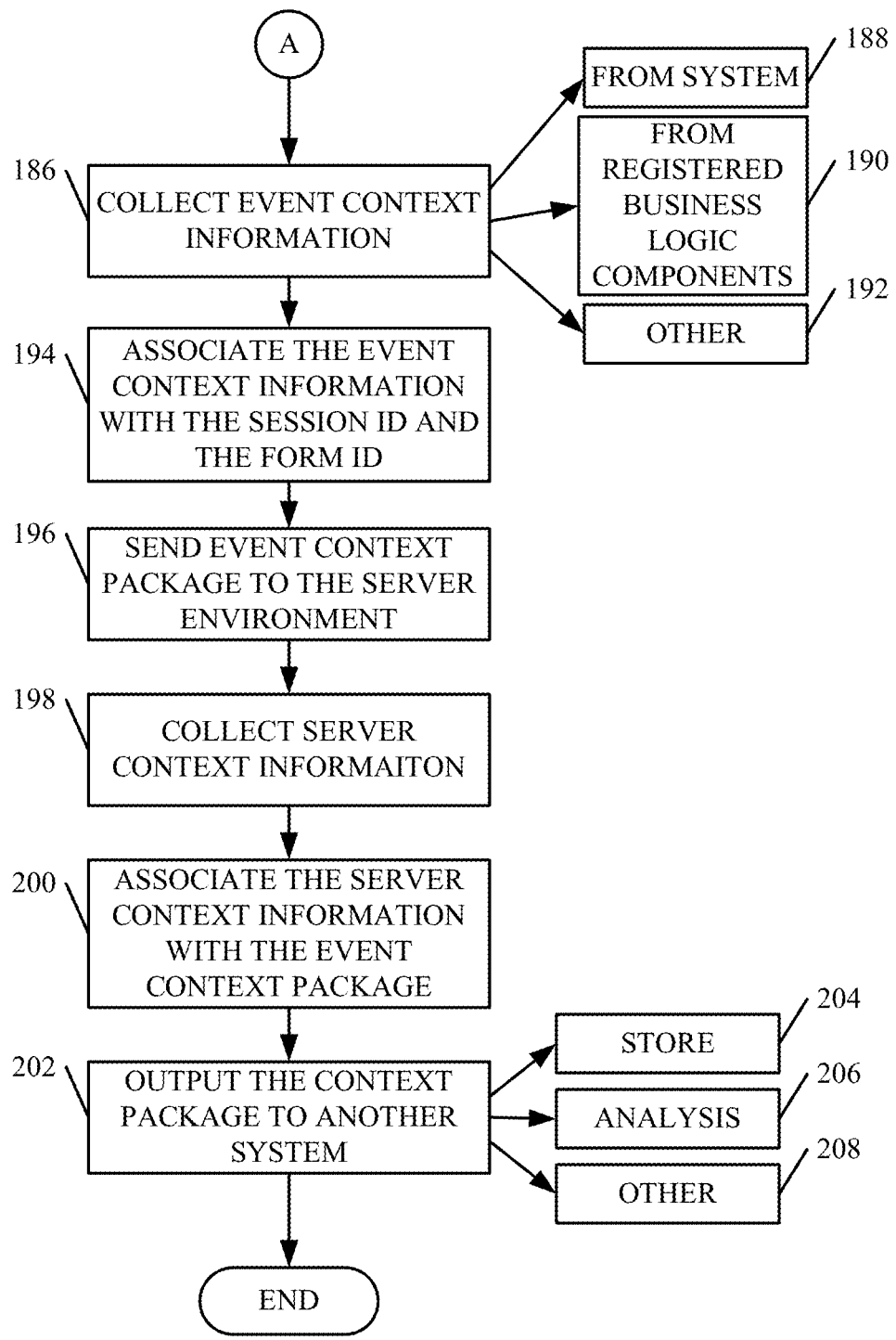

FIGS. 2A and 2B (collectively referred to as FIG. 2) show a flow diagram illustrating one embodiment of the overall operation of architecture 100, in gathering contextual information, in more detail. At some point, any interested observers in business logic system 102 (such as business logic components 114-116) illustratively register with event registration system 128 for varying events for which they can provide context information. This is indicated by block 150 in FIG. 2.

User 112 then begins a session in business system 102. This is detected by event detection system 129. Detecting that the user is beginning a session is indicated by block 152 in FIG. 2. The user can being a session in a wide variety of different ways. For instance, the user can login to business system 102, as indicated by block 154. The user can also begin a session in other ways, as indicated by block 156.

Context gathering system 130 then assigns a unique session identifier to the session and stores a record of the session in client context information store 132. Assigning the session ID is indicated by block 158 in FIG. 2.

Context gathering system 130 then gathers session level context information for the session. This is indicated by block 160. The session level context information can include a wide variety of different information. Table 1 below shows one example of a set of session level context information that can be gathered by context gathering system 130.

TABLE 1

Environment
Browser
Platform
User Role
UniqueUserID (this value can be consistent for the life of this user, regardless of device)
UserLanguage
Locale (user settings)
Default Currency
Device
TimeZone
Build Version Of course, Table 1 shows only one example of a set of session level context data and different or additional data can be gathered as well.

Context gathering system 130 then associates the session level context information with the session ID, in data store 132. Thus, a session context package is generated. The session context package includes the session ID along with the session level context data. This information can be used with each dependent action taken in the session. Thus, instead of repeating the step of gathering session level context with every event, system 120 copies the session context package, or records it with, or refers to it in, all subsequent actions within the session, for which context information is to be gathered. Associating the session level context information with the session ID to obtain the session context package is indicated by block 162 in FIG. 2.

In the embodiment where the computer system for which context information is being gathered is a business system, each action may illustratively be taken in the context on a given form. Therefore, a next dependent action in the hierarchy of actions for which context information is gathered will be a form open user input action. Thus, event detection system 129 detects a user input indicating that the user has opened a form. This is indicated by block 164 in FIG. 2. Context gathering system 130 then assigns a form action identifier (ID) to the detected form open action and collects form context information corresponding to that action. Assigning a form action ID is indicated by block 166 and gathering the form context information is indicated by block 168.

As with the session level context information, the form context information can include a wide variety of information. Table 2 below shows one example of a set of form context information that can be gathered.

TABLE 2

FormID
FormInstance
CompanyID
SessionID
Form Style
Form Category
Open mode (view/edit)
Initial view (GridView, DetailsView, HubView)
Record parameters (one record vs query)

Of course, the information in Table 2 is only an example set of information and different or additional information can be gathered as well.

Context gathering system 130 then associates the form context information with the session ID and the form action ID. The session ID thus links the form open action with the session context information that has already been recorded. Associating the form context information with the session ID and form action ID is indicated by block 170 in FIG. 2.

Event detection system 129 then detects another action or event. This is indicated by block 172 in FIG. 2. An event can be substantially anything that information monitoring system 120 is configured to detect. It can, for instance, be any type of user interaction that user 112 performs with any of the business logic components 114-116, on a control on the opened form, or any other item of business system 100. Detecting a user interaction event is indicated by block 174 in FIG. 2. Some examples of user interaction events can include navigation, actuating a control of any type, opening various menus, and a wide variety of other things. In one embodiment, for instance, even static text controls are configured to express context data when a user attempts to interact with them. This may be the case, for instance, where, even though static text is not an interactive control, the developer may wish to learn how users perceive its role on a form. If a user attempts to interact with it, that may indicate that the user is trying to perform some interaction from that form, that is not enabled, or that is enabled by another control. The developer can then, if he or she wishes, modify the form to make it easier for the user. This is only one example of an even interaction.

An event can also be a performance event. Detecting a performance event is indicated by block 176 in FIG. 2. Some examples of performance events include the amount of time it takes to begin and end a particular business scenario, a business process, a workflow, an action, etc. Performance events can include a wide variety of other things as well.

Event detection system 129 can also detect error events. An error event can be detected each time an error condition is recorded. An error event is indicated by block 178 in FIG. 2.

Event detection system 129 can also detect user feedback actions. This is indicated by block 180 in FIG. 2. For instance, if a user provides feedback at any point during the user's interaction with system 100, the feedback and its associated context can be detected.

It will also be noted that event detection system 129 can detect a wide variety of other events as well. This is indicated by block 182.

Once an event is detected, context gathering system 130 assigns a timestamp, sequence number, and event identifier to the detected event. This is indicated by block 184 in FIG. 2. The sequence number may be useful in identifying any potentially lost events. For instance, a gap in sequencing may indicate that one or more particular events, that were detected, were lost or otherwise not recorded in client context information store 132, for some reason.

Context gathering system 130 then collects event context information for the event. This is indicated by block 186 in FIG. 2. The context information can be from business system 100, or other systems. This is indicated by block 188.

Event registration system 128 can also notify the monitor add-ins 136-138 for any business logic components 114-116 that have registered to receive notice when this type of event occurs. The add-ins then illustratively provide any desired additional context information from their corresponding business logic component. Receiving context information from registered business logic components is indicated by block 190 in FIG. 2.

By way of example, the developers of each different business logic component 114-116 may have a specific set of questions they would like answered about how their users perceive and interact with their components. The developer can author the corresponding monitor add-in 136-138 to answer these types of questions (e.g., to provide context information indicative of the answers to the questions), with respect to user 112 using business system 100. This context information can be provided by the particular add-in 136-138, in addition to the context already provided by context gathering system 130.

As an example, it may be that event gathering system 128 notifies monitor add-in 136 in business logic component 140 when user 112 has clicked a particular button on a particular form. At that point, monitor add-in 136 can provide additional context to that event or action, indicating details about the particular business process that has begun. Where business logic component 114 is an accounting application, for instance, and where the user 112 is using component 114 to post entries to a general ledger, monitor add-in 136 may provide additional context, including the number of transactions being posted, the number of debits, the number of credits, the average dollar amount per transaction, etc. These are only examples of context information.

In another embodiment, monitor add-in 136 may indicate that it is going to be providing synchronous or asynchronous performance data corresponding to the button click. For instance, it may be that monitor add-in 136 is to provide context information indicating the amount of time between the just-detected button click, and a next user interaction with the current form. In that case, add-in 136 indicates this to context gathering system 130, and system 130 will wait to receive that performance data from monitor add-in 136, before completing preparation of the event context package.

It will be noted that context gathering system 130 can gather a wide variety of other context information, in other ways. This is indicated by block 192 in FIG. 2.

Context gathering system 130 also associates the event context information that it has just gathered, with the session ID and the form ID for the current session and current form. This is indicated by block 194 in FIG. 2. These identifiers tie the action and its corresponding context, to the session context information and form context information that was previously gathered.

In one embodiment, before sending the event context package to server environment 104, where additional context can be added, information monitoring system 120 stores it in client context information store 132 until any additional, and perhaps asynchronous, context data is added by any desired source in business system 100. For instance, where one of the add-ins on one of the business logic components 114-116 indicates that it will be providing performance context data or other asynchronous context information, the event context package can be stored in client context information store 132 (which can be configured as a cache or otherwise) until the pending context information has been added to the package. At that point, it can be sent to server system 104.

Information monitoring system 120 then sends the event context package to the server environment 104, as indicated by block 196 in FIG. 2. Server information monitoring system 133, much like information monitoring system 120 on business system 100, collects server context information corresponding to the event context package that it has just received. This is indicated by block 198. For example, some of the business logic for system 100 may be executed on different servers in a cluster that is deployed on server system 104. The server context information may include the particular server, in the particular cluster, that performed the business logic. It may include information such as the number of central processing units (CPUs) working for business system 100, at that particular time. It may include a wide variety of other information as well.

The server context information is then associated with the event context package by server information monitoring system 133. This is indicated by block 200 in FIG. 2. At that point, the context package is complete.

In one embodiment, server information monitoring system 133 then outputs the context package for use by another system. This is indicated by block 202. For instance, the context package can simply be stored for later analysis. This is indicated by block 204. It can also be output to a context data analysis system 106 for immediate analysis. This is indicated by block 206. It can be output for use by other systems as well, and this is indicated by block 208 in FIG. 2.

Figure 3:
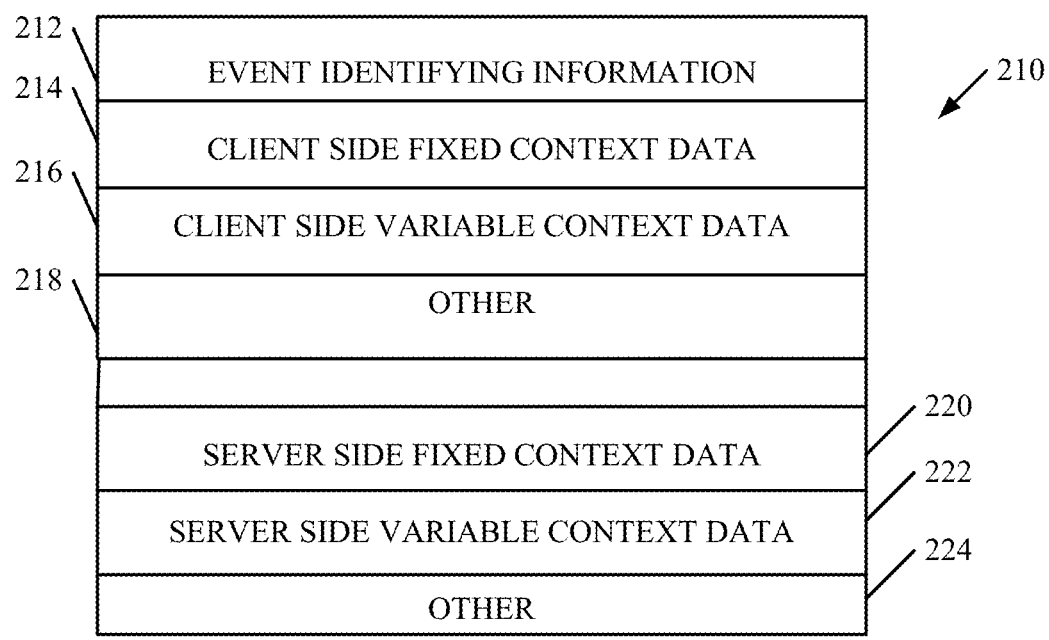
FIG. 3 shows one embodiment of a portion of a context package.

FIG. 3 is a block diagram of a portion of an event context package. It is only one example and a wide variety of other information can be included as well. In the embodiment shown in FIG. 3, event context package 210 includes event identifying information 212 that identifies the particular event detected. It includes client side fixed data gathered at business system 100. This is indicated by block 214. The fixed data may be data that is gathered every time an event is fired, or every time this particular type of event is detected. It also, however, includes client side variable context data 216. This type of context data may vary based upon the current context. It may vary based upon how the user arrived at the form, for instance, or the user's most immediate previous action. It can vary based on a wide variety of different things as well. The client side data can also include a wide variety of different or additional data, as is indicated by block 218.

The server side context information can include fixed context data 220, variable context data 222 and other data 224. As with the client side data, the fixed data may be a particular set of context data that is gathered for every event, for every event of this type, etc. The variable context data can vary based on substantially any criteria desired.

Figure 4:
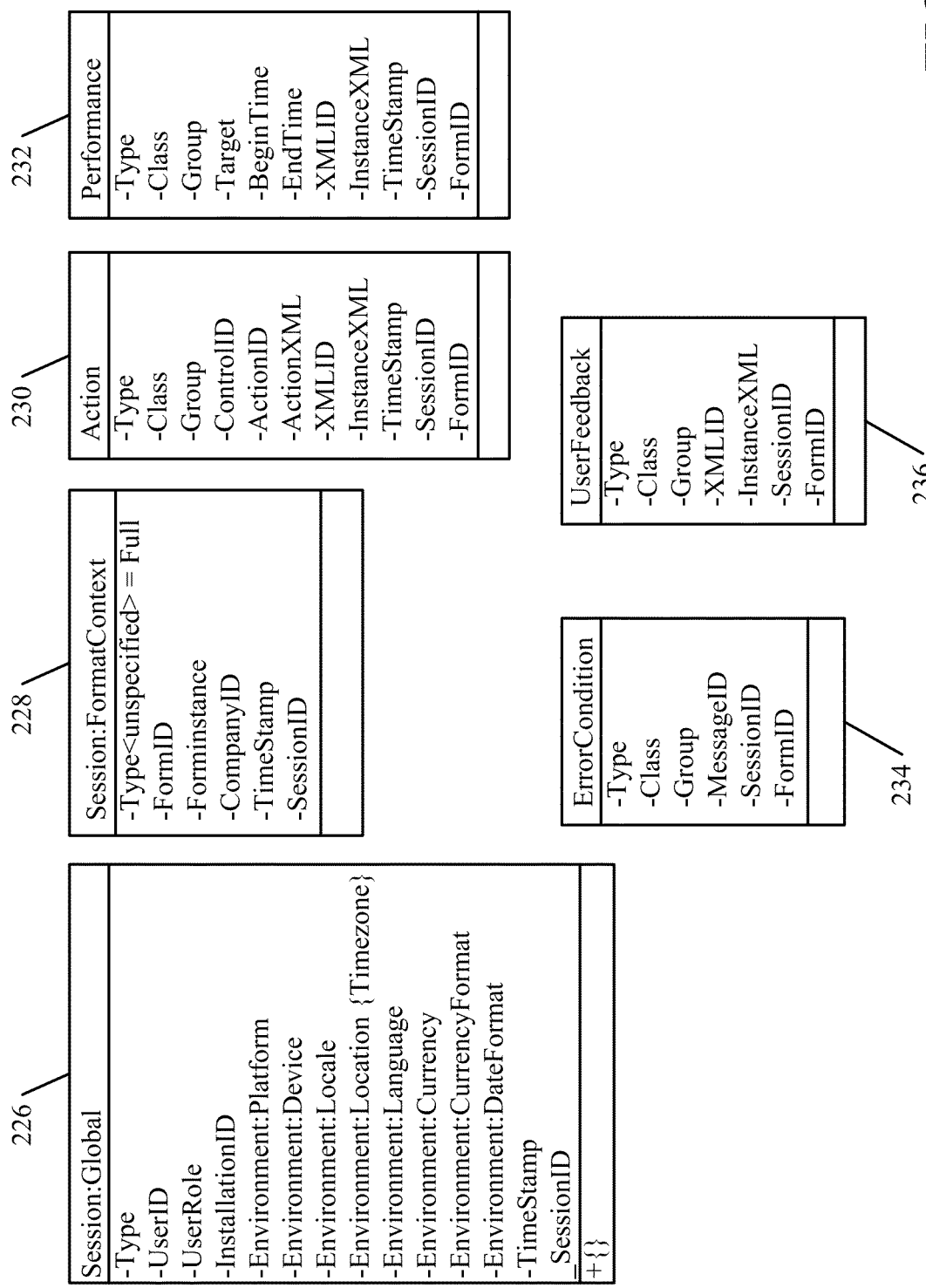
FIG. 4 illustrates one embodiment of a set of actions for which context information can be gathered.

FIG. 4 shows one embodiment of a plurality of different events that are located on different hierarchical levels as just described. FIG. 4 shows, in one embodiment, the type of context information that is gathered each time a session is initiated by user 112. The global session context information is indicated generally at 226 in FIG. 4. It can be seen that the context information can include the session type, the user ID, the user role in business system 100, the particular platform, device, locale, location (e.g., time zone), language, currency, currency format and date format that is being used by system 100, it can include a timestamp and the session ID as well.

FIG. 4 also shows one example of a set of form context information that can be gathered every time a form is opened. This is indicated generally at 228. It can include a form type, a form ID, a form instance, a company ID that is using business system 100 or that otherwise is associated with a particular form being opened, a timestamp and the session ID.

FIG. 4 also shows various context information that can be collected for every user interaction that is detected. This is indicated generally at 230. It includes an action type, class, group, control ID, action ID, action XML, XML ID, instance XML, timestamp, and the session ID and form ID. It will be noted that the session ID and form ID tie the action context data 230 back to the context data 226 gathered for the session and the context data 228 gathered for the form. Thus, the context information 226 and 228 does not need to be repeated at 230.

The same is true for the performance context information indicated generally at 232. That context information includes type, class, group, target (which identifies the element being recorded—such as a predefined enumeration, serializer, metadata load, database query, etc.), beginning time, ending time, XML ID, instance XML, a timestamp and the session ID and form ID. Again, the session ID and form ID tie context information 232 back to the session context information 226 and the form context information 228.

FIG. 4 also shows one embodiment of a set of error condition context information 234 that can be gathered. It can include type, class and group identifiers, along with a message ID for the error message, and the session ID and form ID.

FIG. 4 also shows one example of a set of user feedback context information 236 that can gathered. It includes a type, class and group identifier, along with an XML ID, instance XML, and the session ID and form ID.

In FIG. 4, the context information 230 for a user interaction has both fixed and variable context data (as discussed above with respect to FIG. 3). The fixed context data can include the type, class and group identifier, along with the control identifier and action identifier. The variable data can include the XML documents. As one example, Table 3 below shows an example XML document that can supply keywords, and Table 4 shows an example of an XML document that can provide specific contextual data for a given event.

TABLE 3

```
// framework xml - data from application team
<KEYWORDXML>
    <KEYWORD>
        "CREATE"
    </KEYWORD>
    <KEYWORD>
        "PURCHASE ORDER"
    </KEYWORD>
</KEYWORDXML>
```

TABLE 4

```
<CREATE_PURCHASE_ORDER_XML>
    <SOURCE>
        "Requisition from email" // context -
        the type of purchase order source
    </SOURCE>
</CREATE_PURCHASE_ORDER_XML>
```

It can be seen in Table 3 that the keywords "create" and "purchase order" will be provided as part of the context data each time a particular event is detected. Table 4 shows that a particular purchase order source will also be included in the contextual information. Table 4 shows, for example, that the purchase order source is a requisition from e-mail.

Table 5 below shows an example in which one of the business logic components 114-116 indicates to information monitoring system 120 that performance context data will be provided for a specific event. Table 5 shows that the business logic component can identify the type of event, the identity of application-specific XML and the application-specific XML, itself, along with the keyword XML.

TABLE 5

```
TelemetryEvent myEvent = new TelemetryEvent(
    EVENT_PERFORMANCE,              // type of event
    CREATE_PURCHASE_ORDER_XML,      // the ID of my application
specific XML - app define
    MyCreatePurcahsOrderXML         // application specific XML - app
define
    MyKeywordXML                    // keyword XML - app data
    );
myEvent.Fire();
```

Of course, these are examples only.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
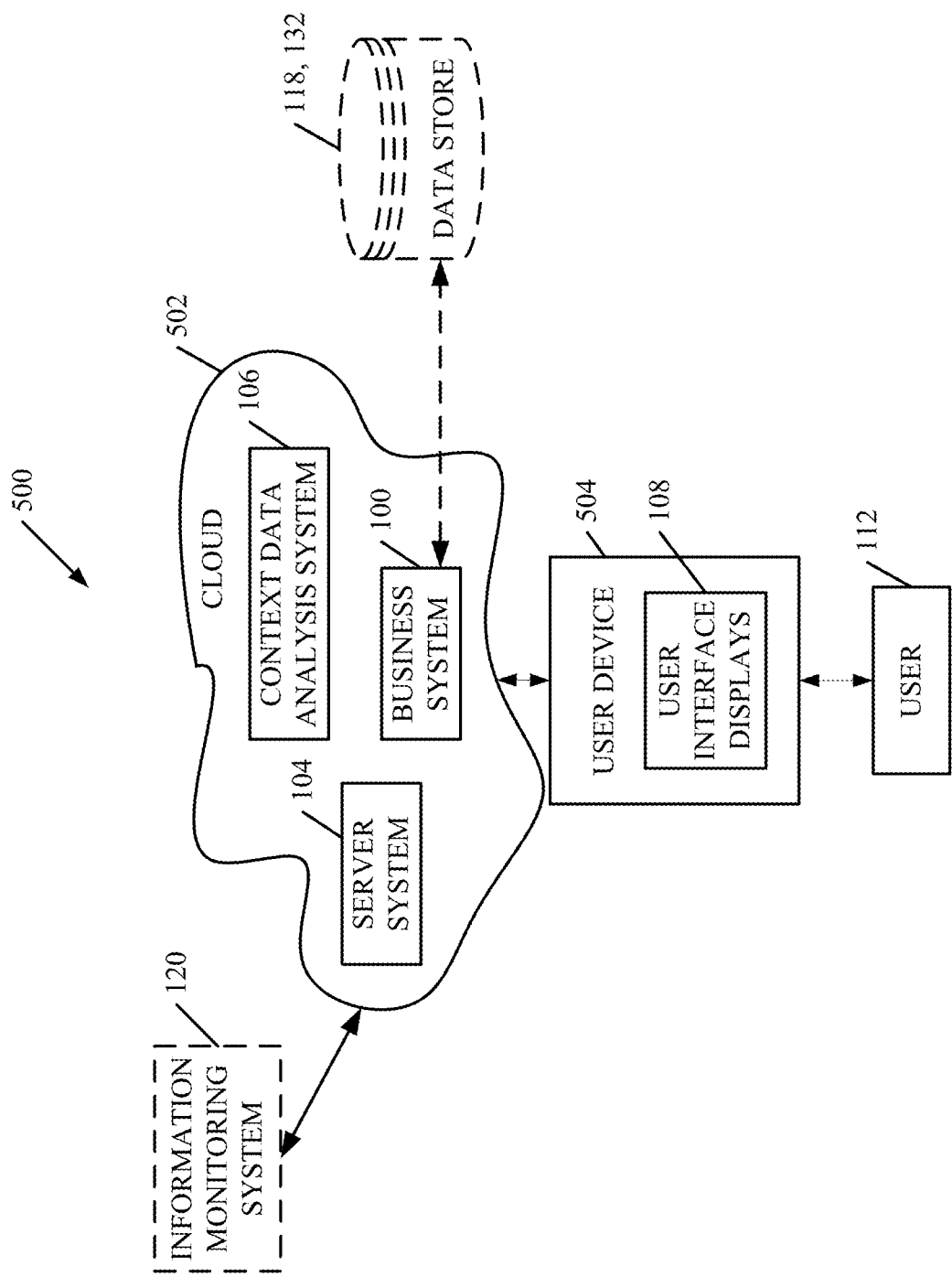
FIG. 5 is a block diagram of one embodiment of a cloud computing environment.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that systems 102, 104 and 106 can all be located in cloud 502 (which can be public, private, or a combination where portions are public while others are private). Therefore, user 112 uses a user device 504 to access those systems through cloud 502.

Figure 6:
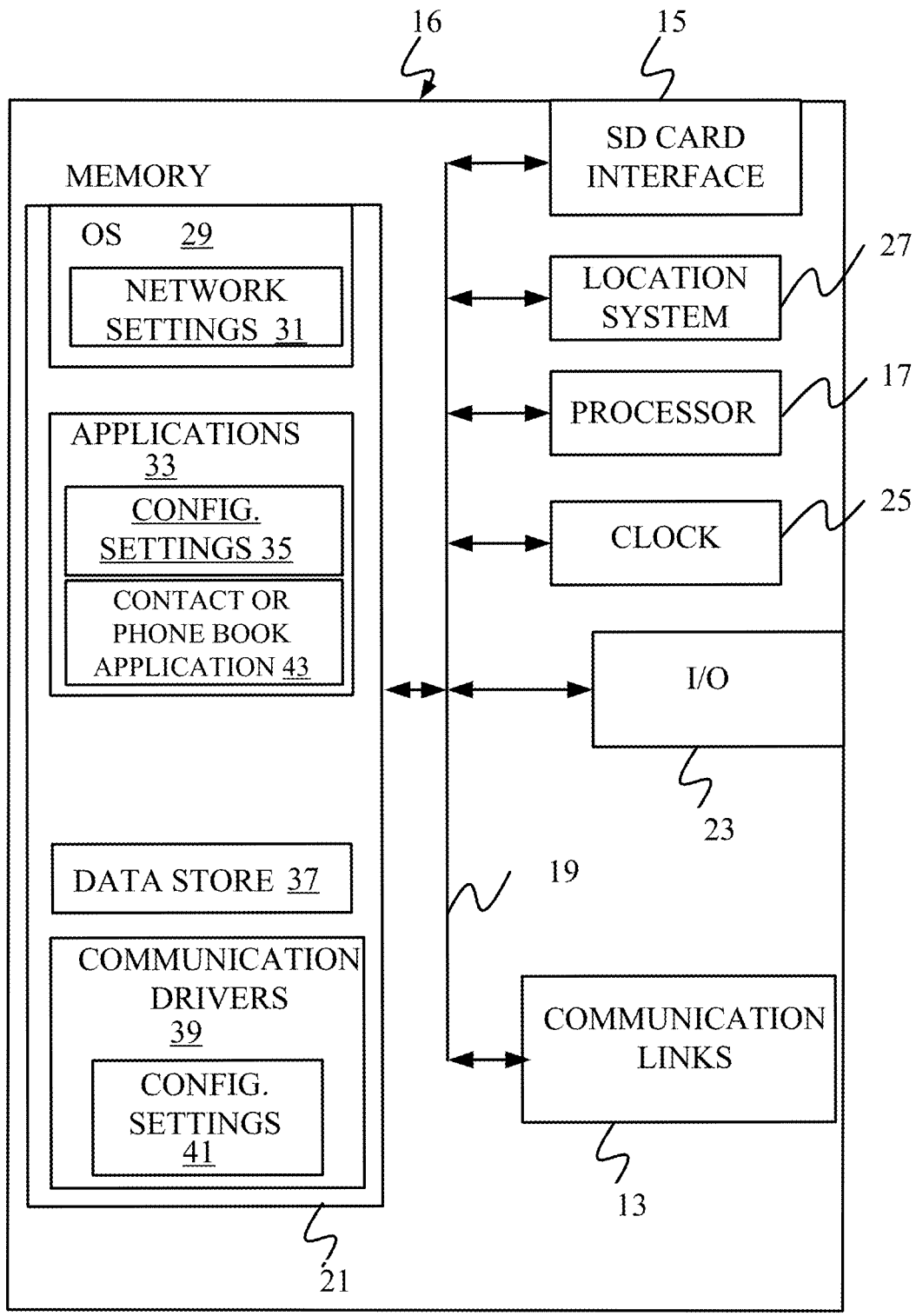
FIGS. 6-10 show various embodiments of mobile devices.

FIG. 5 also depicts another embodiment of a cloud architecture. FIG. 6 shows that it is also contemplated that some elements of architecture 100 can be disposed in cloud 502 while others are not. By way of example, data stores 118 and 132 can be disposed outside of cloud 502, and accessed through cloud 502. In another embodiment, any of systems 102, 104 and 106 or parts of them (e.g., information monitoring system 120) can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

FIG. 6 is a simplified block diagram of one illustrative embodiment of a handheld or mobile computing device that can be used as a user's or client's hand held device 16, in which the present system (or parts of it) can be deployed. FIGS. 7-10 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 122 or 137 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
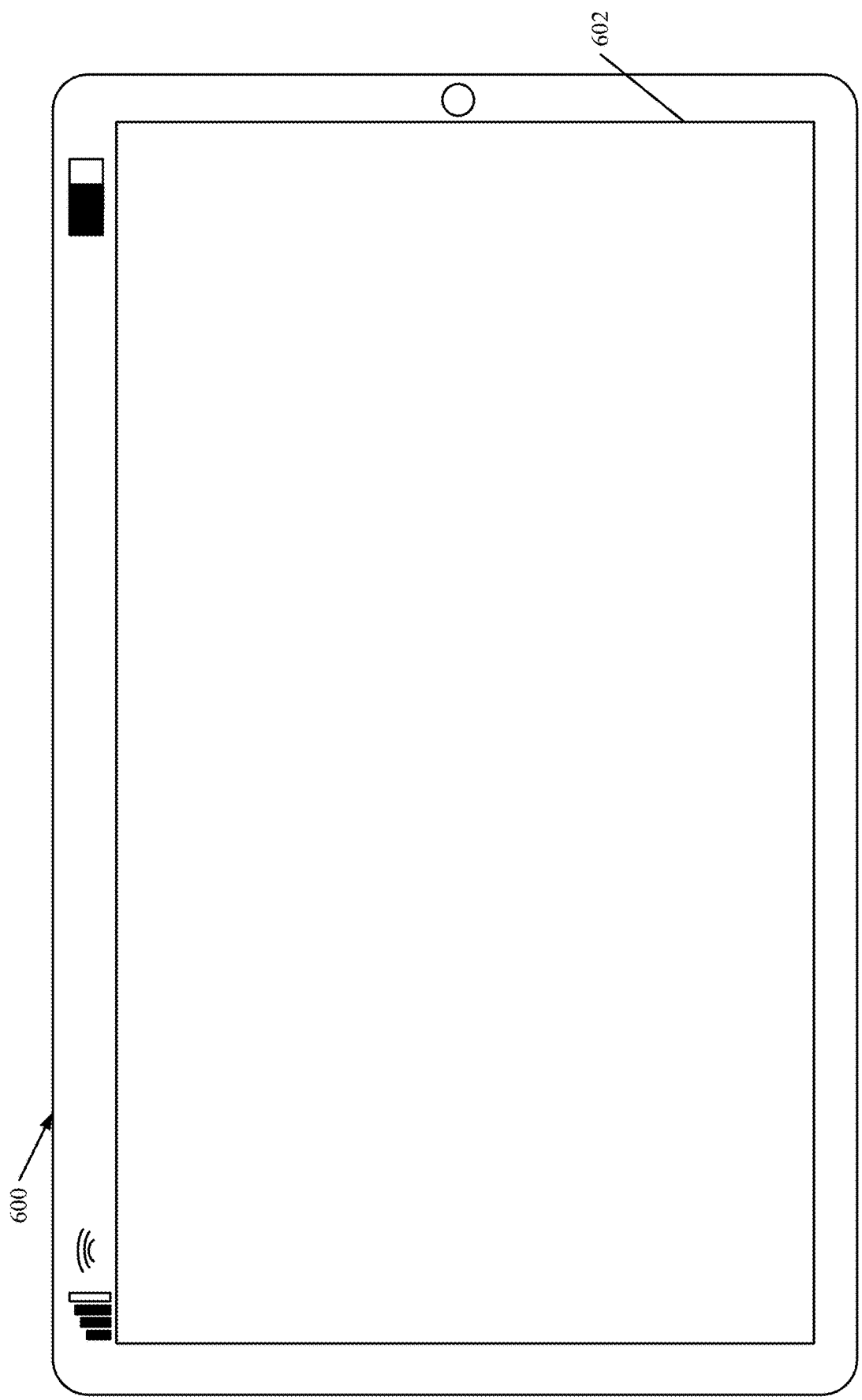

FIG. 7 shows one embodiment in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
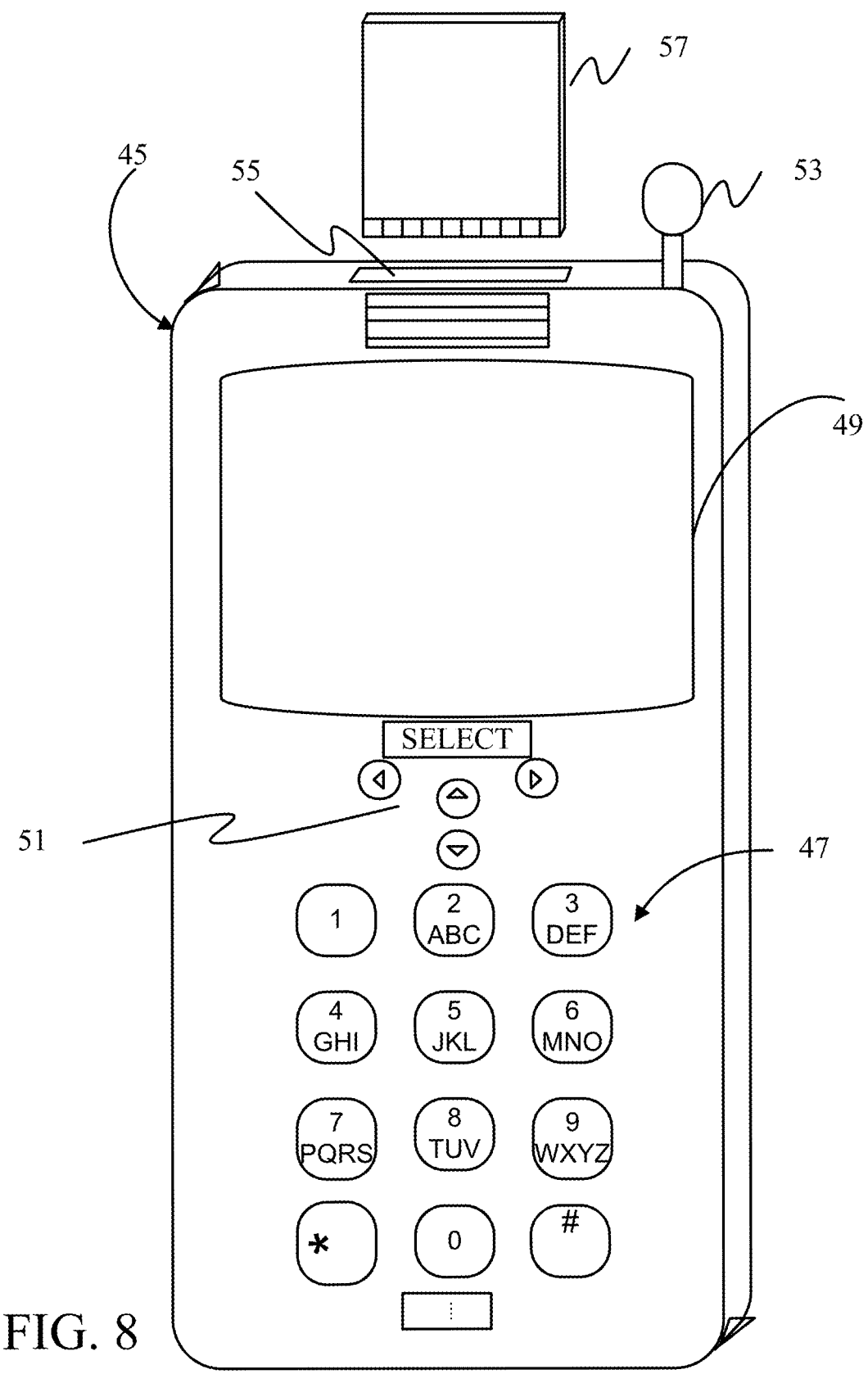
Figure 9:
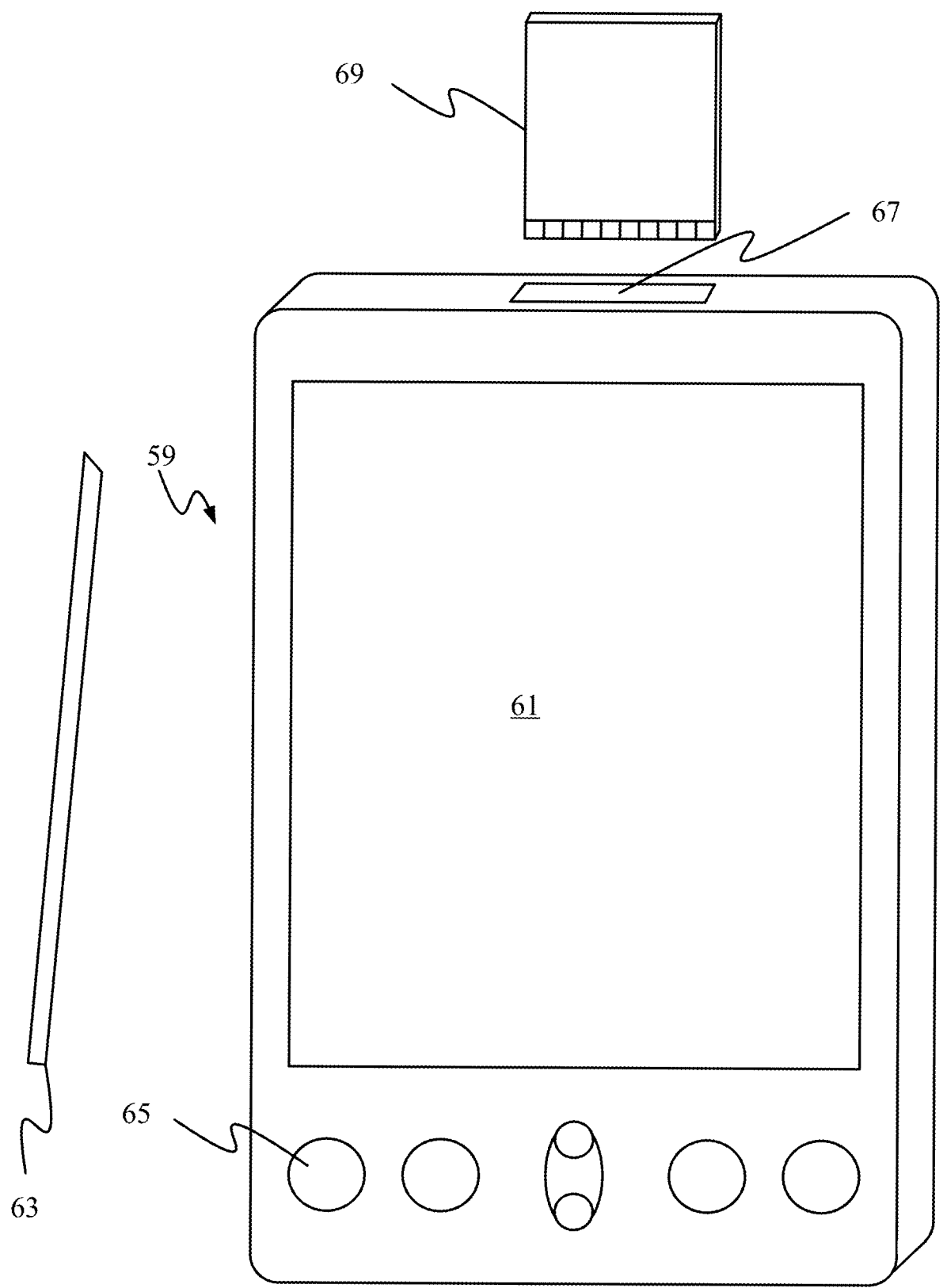

FIGS. 8 and 9 provide additional examples of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
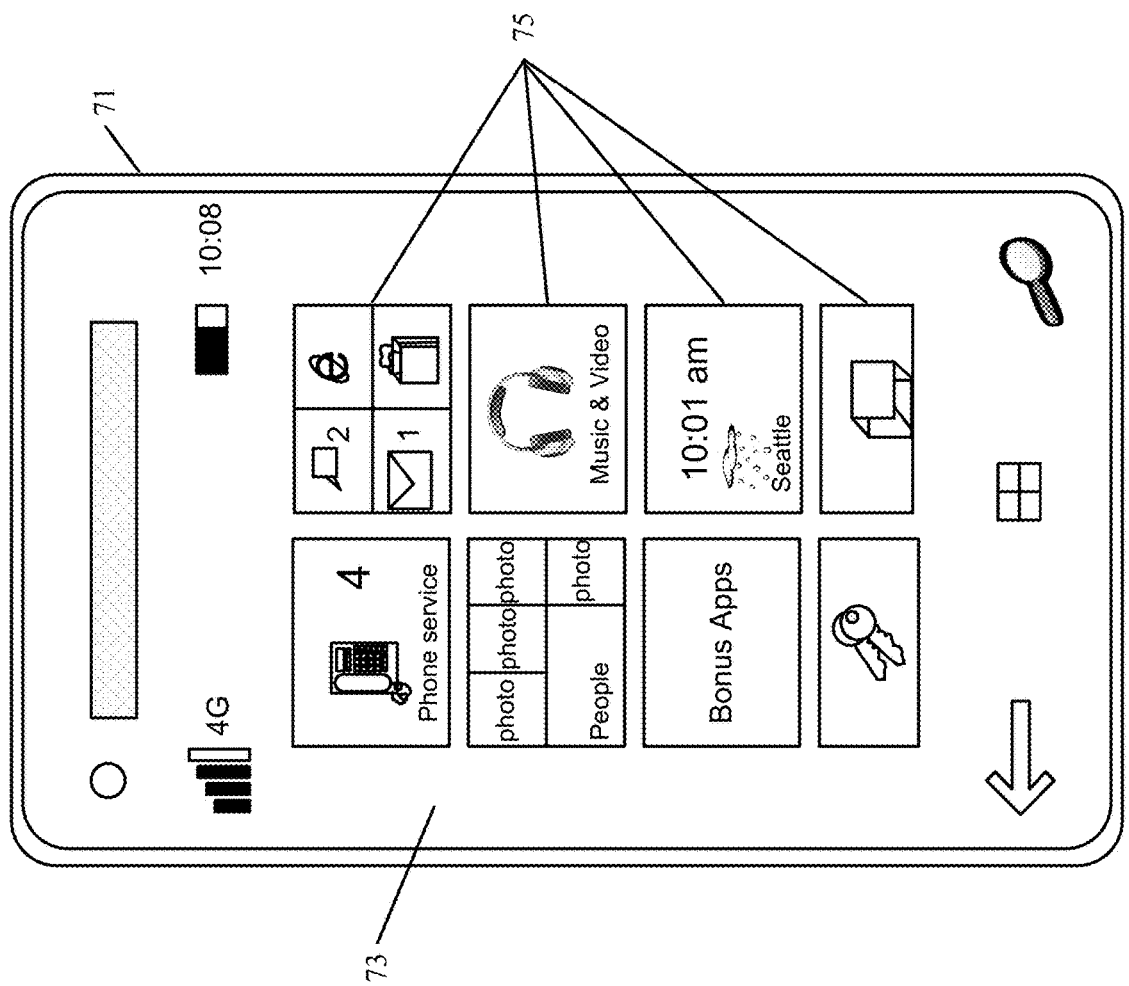

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
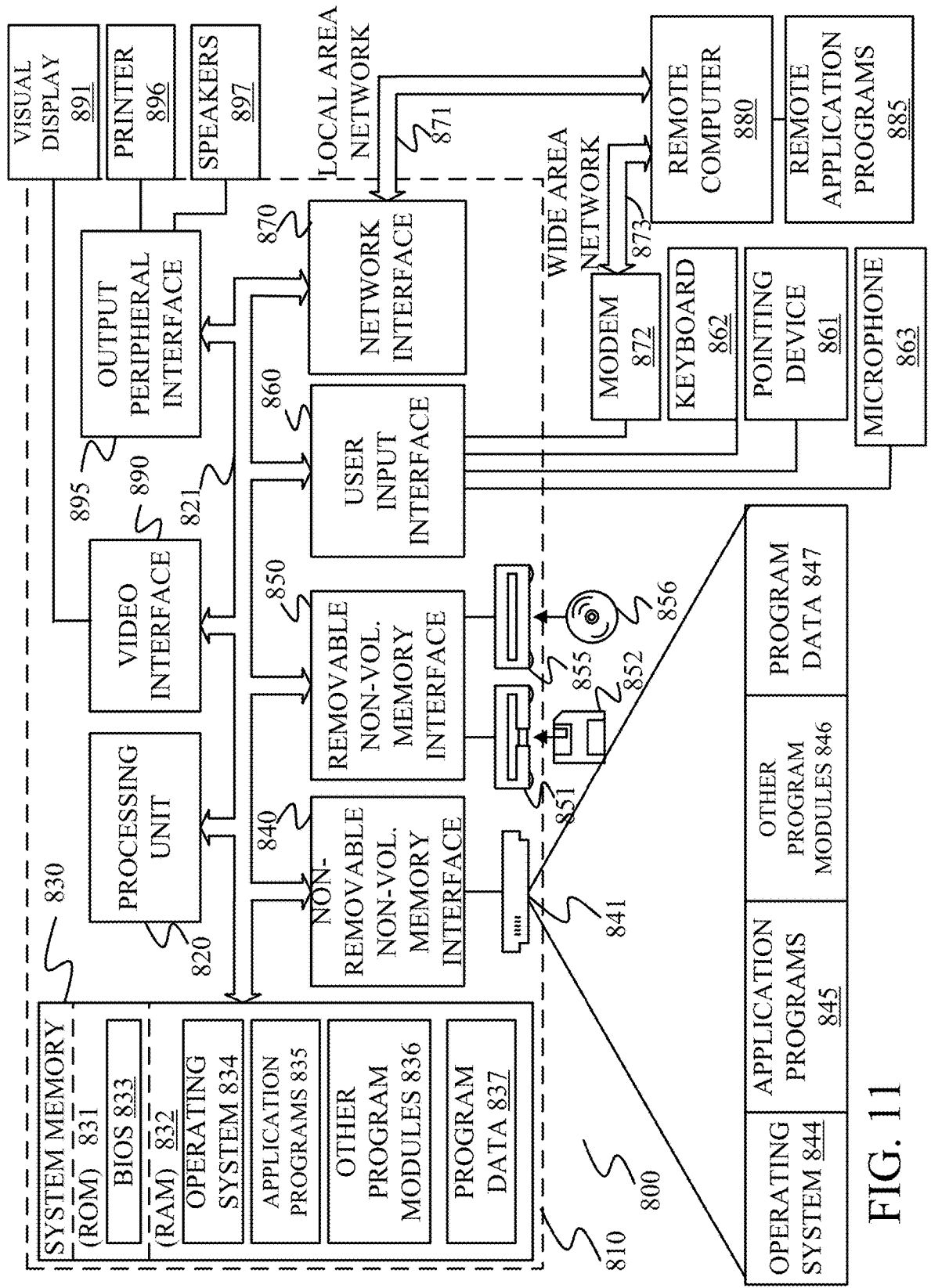
FIG. 11 shows a block diagram of one embodiment of a computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 122 or 137), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to:
receive, from an application configured to run a computing process that operates on data associated with the computing system, an event registration input indicative of a particular event;
based on the event registration input, register the application to receive notification when the particular event is detected;
based on detecting occurrence of the particular event in the computing system, generate an event context package corresponding to the occurrence; and send an event notification to the application based on the registration, the event notification notifying the application of the occurrence of the particular event;
in response to sending the event notification,
receive a context notification from a monitor component of the application, the monitor component being configured to contextually monitor the application, and the notification indicating that the monitor component is configured to provide context information associated with the particular event; and
after receiving the context notification,
receive the context information from the monitor component, the context information including a monitored context of the application corresponding to the particular event; and
send, to a server environment, the event context package that
includes the context information received from the monitor component of the application, and
associates the context information with the occurrence of the particular sent and with higher level context information corresponding to a higher level event in a hierarchy of events associated with the particular event.

2. The computing system of claim 1 wherein the notification comprises an asynchronous notification indicating that the monitor component is configured to provide the context information associated with the particular event asynchronously, and wherein the computing system is configured to wait to receive the context information before outputting the event context package based on the asynchronous notification.

3. The computing system of claim 1, wherein the instructions configure the computing system to detect the higher level event and gather the higher level context information for the higher level event.

4. The computing system of claim 3 wherein performance of the particular event is dependent on performance of the higher level event, and further comprising:
a context information data store that stores gathered context information.

5. The computing system of claim 4 wherein the instructions configure the computing system to associate the context information with the higher level context information by identifying the higher level context information corresponding to the higher level event in the context information data store and including an entry in the context information data store that the context information is associated with the higher level context information.

6. The computing system of claim 5 wherein the instructions configure the computing system to generate the event context package with a set of predetermined items of context information and a set of variable items of context information, and the monitor component is configured to provide at least the variable items of context information.

7. The computing system of claim 1, wherein the application comprises a client application and the context information comprises client side data.

8. The computing system of claim 1 wherein the instructions configure the computing system to:
receive, from a plurality of different applications, event registration inputs that indicate the particular event, wherein each application includes a corresponding monitor component configured to provide context information associated with the particular event;
based on the event registration inputs, register each of the applications to receive a notification when the particular event is detected
based on detecting occurrence of the particular event in the computing system, send event notifications to the plurality of different application based on the registration, the event notifications notifying the plurality of different applications of the occurrence of the particular event;
receive the context information for each of the plurality of different applications; and
generate the event context package to include the context information for each of the plurality of different applications.

9. The computing system of claim 1, wherein the computing system comprises a client system that includes the application and the monitor component, the client system being configured to output the event context package to a server environment configured to add server context information in the event context package.

10. The computing system of claim 1, wherein the monitor component comprises an add-in on the application.

11. A computer-implemented method, comprising:
receiving, from an application configured to run a computing process that operates on data associated with a computing system, an event registration input indicative of a first event associated with an initiation of a computing session on the computing system; and
based on the event registration input, registering the application to receive notification when the first event is detected;
based on detecting occurrence of the first event in the computing system and on the registration, sending an event notification to the application, the event notification notifying the application of the occurrence of the first event;
obtaining a session identifier corresponding to the computing session;
obtaining session level context information associated with the computing session;
associating the session level context information with the session identifier;
detecting that a higher level event, that is hierarchically related to the first event in a hierarchy of events, is performed within the computing session;
obtaining an event identifier corresponding to the higher level event;
receiving higher level context information from a monitor component of the application, the monitor component being configured to contextually monitor the application, and the higher level context information being indicative of a context of the application relative to the higher level event; and
sending, to a server environment, an event context package that
includes the session level context information, and
associates the higher level context information with the occurrence of the higher level event and with the session identifier.

12. The computer-implemented method of claim 11 wherein the computing system comprises a client computing system and wherein outputting comprises:
outputting the event context package to a server environment for addition of server context information to the event context package.

13. The computer-implemented method of claim 11, comprising:

receiving, from the monitor component, an asynchronous notification indicating that the monitor component is configured to provide the event level context information asynchronously, and waiting to receive the event level context information before outputting the event context package.

14. The computer-implemented method of claim 11, and further comprising:

associating the event level context information with the session level context information by generating a data entry in a context information data store, the data entry including a data field that identifies the session identifier.

15. The computer-implemented method of claim 11 and further comprising:

detecting a further dependent event that is dependent on performance of the higher level event;

obtaining further dependent context information for the further dependent event; and associating the further dependent context information with the session identifier and the event Identifier.

16. The computer-implemented method of claim 11 wherein receiving higher level context information comprises:

notifying the application that the higher level event is detected; and receiving the event level context information from the application in response to the notification.

17. A method performed by a computing system, the method comprising:

receiving, from an application configured to run a computing process that operates on data associated with the computing system, an event registration input indicative of a particular event;

based on the event registration input, registering the application to receive notification when the particular event is detected;

based on detecting occurrence of the particular event in the computing system, generating an event context package corresponding to the occurrence; and sending an event notification to the application based on the registration, the event notification notifying the application of the occurrence of the particular event;

receiving context information from a monitor component of the application in response to the event notification, the monitor component being configured to contextually monitor the application, and the context information including a monitored context of the application corresponding to the particular event; and sending, to a server environment, the event context information package that includes the context information received from the monitor component of the application, and associates the context information with the occurrence of the particular event and with higher level context information corresponding to a higher level event in a hierarchy of events associated with the particular event.

18. The method of claim 17 and further comprising:

receiving, from a plurality of different applications, event registration inputs that indicate the particular event, wherein each application includes a corresponding monitor component configured to provide context information associated with the particular event;

based on the event registration inputs, registering each of the applications to receive a notification when the particular event is detected based on detecting occurrence of the particular event in the computing system, sending event notifications to the plurality of different application based on the registration, the event notifications notifying the plurality of different applications of the occurrence of the particular event;

receiving the context information for each of the plurality of different applications; and generating the event context package to include the context information for each of the plurality of different applications.

19. The computer-implemented method of claim 17, wherein the application comprises a client application and the context information comprises client side data.

20. The computer-implemented method of claim 17, wherein the monitor component comprises an add-in on the application.

* * * * *